United States Patent [19]
Bobbitt, III et al.

[11] Patent Number: 5,713,245
[45] Date of Patent: Feb. 3, 1998

[54] STEERING COLUMN CLAMPING MECHANISM

[75] Inventors: John Thomas Bobbitt, III; Stephen John Baker, both of Warwickshire, England

[73] Assignee: NASTECH Europe, Ltd., Coventry, England

[21] Appl. No.: 648,474

[22] Filed: May 16, 1996

[30] Foreign Application Priority Data

May 18, 1995 [GB] United Kingdom ............... 9510038

[51] Int. Cl.⁶ ................... B62D 1/18; F16B 7/04
[52] U.S. Cl. ............. 74/493; 280/775; 403/12; 403/373
[58] Field of Search ............. 74/493, 531; 280/775; 24/458; 403/12, 13, 373; 269/121, 246, 287

[56] References Cited

U.S. PATENT DOCUMENTS

| | | | |
|---|---|---|---|
| 4,002,328 | 1/1977 | Wolf et al. | 269/246 X |
| 4,657,281 | 4/1987 | Haldric et al. | 280/775 |
| 4,788,880 | 12/1988 | Kester | 74/493 |
| 4,900,178 | 2/1990 | Haldric et al. | 403/373 X |
| 5,090,833 | 2/1992 | Oertle et al. | 403/12 |
| 5,338,064 | 8/1994 | Sadakata et al. | 280/775 |
| 5,358,350 | 10/1994 | Oertle | 403/12 |

FOREIGN PATENT DOCUMENTS

| | | |
|---|---|---|
| 0 084 601 A1 | 10/1982 | European Pat. Off. |
| 0 368 700 A1 | 5/1990 | European Pat. Off. |
| 0 443 910 A1 | 8/1991 | European Pat. Off. |
| 2 579 159 A1 | 3/1985 | France. |
| 2 191 273 A | 12/1987 | United Kingdom. |

*Primary Examiner*—Charles A. Marmor
*Assistant Examiner*—Troy Grabow
*Attorney, Agent, or Firm*—Michael H. Minns; Robert F. Palermo

[57] ABSTRACT

A steering column clamping mechanism has bolt links interconnecting substantially parallel spaced-apart plates which basically form a rectangle and are so linked one to another that the rectangle can assume an orientation defining a non-rectangular parallelogram or lozenge. One of the connecting bolts is mounted in a bracket fixed to a chassis of a vehicle, the bracket having a depending reaction plate against which an actuating member can be urged to push the plate member away from the reaction member. Through the linkage, this causes the other plate member to compress onto a steering column tube member to clamp it between that plate and the opposite side of the reaction plate.

22 Claims, 1 Drawing Sheet

STEERING COLUMN CLAMPING MECHANISM

BACKGROUND OF THE INVENTION

This invention relates to a steering column clamping mechanism.

Known steering column clamping mechanisms tend to require rather close manufacturing tolerances and a typical type can be seen in EP-A-0 242 928 U.S. Pat. No. 4,788,880).

The foregoing illustrates limitations known to exist in present steering column clamping mechanisms. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a steering column clamping mechanism including two substantially parallel, spaced apart plate members, a first connecting link joining said two plate members, a bracket supporting said first connecting link, a second connecting link joining said two plate members remote from said first connecting link, a reaction plate between said two plate members, a steering column tube member located between said first and second connecting links and located between and being clampable by one of said plate members and one side of said reaction plate, and an actuating member located to act between the other of said two plate members and the opposite side of said reaction plate; the respective connections between said two plate members and said first and second connecting links being such as to allow said two plate members to reorientate their direction while maintaining their mutual parallelism when said actuating member is caused to urge said other plate member and said reaction plate apart, thereby to cause said one plate member and said reaction plate to clamp said steering column tube member.

The foregoing and other aspects will become apparent from the following detailed description of the invention when considered in conjunction with the accompanying drawing figures.

BRIEF DESCRIPTION OF THE DRAWING FIGURES

FIG. 1 is a sectional end view of part of a steering column clamping mechanism, taken on the line X—X in FIG. 2; and FIG. 2 is a side view of the part of the clamping mechanism shown in FIG. 1, with a part of plate member 2 removed.

DETAILED DESCRIPTION

Figure 1:
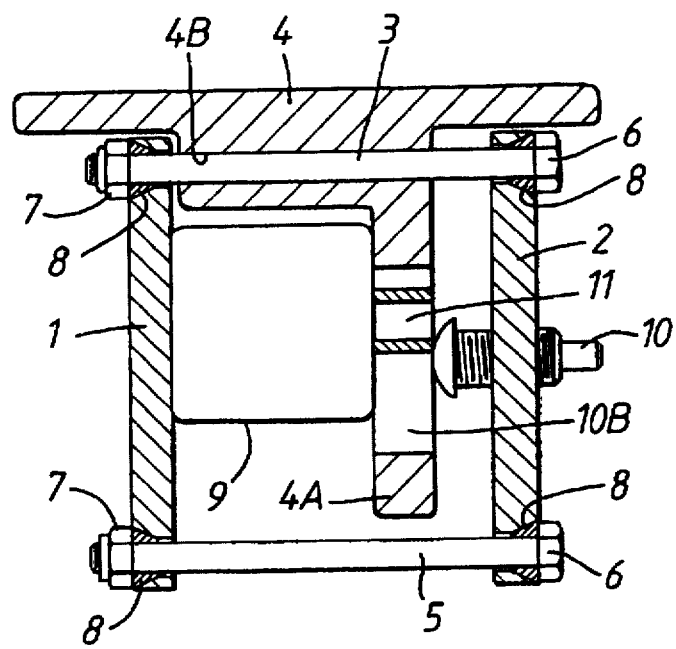

According to the present invention, as illustrated on the Figures steering column clamping mechanism includes two substantially parallel, spaced apart plate members, 1, 2 first and second connecting links 3 joining the plate members, a bracket fixed to the vehicle chassis and supporting said first connecting link, a second connecting link joining said two plate members remote from said first connecting link, a reaction plate 4A between said two plate members, a steering column tube member 9 located between said first and second connecting links 3,5 and located between and being clampable by one of said plate members 1, 2 and one side of said reaction plate, 4A and an actuating member 10 located to act between the other of said two plate members and the opposite side of said reaction plate; the respective connections between said two plate members and said first and second connecting links being such as to allow said two plate members to reorientate their direction while maintaining their mutual parallelism when said actuating member 10 is caused to urge said other plate member and said reaction plate apart, thereby to cause said one plate member 1 and said reaction plate 4A to clamp said steering column tube member 9.

Preferably, said reaction plate 4A is joined to and forms part of said bracket 4. Said first connecting link 3 can be in the form of a bolt member passing through said bracket with opposite ends being anchored to said first and second plate members. Said second connecting link 5 can be a bolt member anchored at opposite ends to said first and second plate members, respectively. The respective connections between said two plate members and said first and second connecting links can be in the form of washers. The washers can be domed washers set in their plate members.

When viewed on end, the plate members 1, 2 and their connecting links 3, 5 can be substantially in the form of a rectangle and the reaction plate 4A can be substantially parallel, in an unclamped state of the tube member 9, to the two plate members. The steering column tube member 9 in the region where it passes through the clamping mechanism can also be substantially rectangular in outer section.

The actuating member 10 can be in the form of a clamp bolt which is screwed in and out of the second plate member 2 to extend the clamp bolt towards and away from the reaction plate 4A and to thereby move the second plate member 2 away from and toward the reaction plate. Other possible types of actuating member can be a cam arrangement or a solenoid-operated device.

Provision can be made to limit travel of the steering column tube member and this can be achieved by providing a protrusion on the outside of the steering column tube member, which protrusion can ride in a slot 4C provided in the reaction plate.

The FIGURES show part of a steering column clamping mechanism including two substantially parallel, spaced apart plate members 1, 2, a first connecting link 3 joining the two plate members 1 and 2, a bracket 4 supporting the connecting link 3 and a second connecting link 5 joining the two plate members 1, 2 remote from the first connecting link 3. The bracket 4 is fixed, e.g. to the chassis of a vehicle.

In the form shown, each connecting link 3, 5 is in the form of a bolt, each passing through the two plate members 1 and 2 and being secured by bolt heads and nuts 6, 7, respectively. The bolt of the connecting link 3 passes through a bore 4B in the bracket 4.

As shown, the connecting links and plate members produce a substantially rectangular form when viewed from the orientation given in FIG. 1. However, provision is made at the respective connections between the plate members and connecting links so as to allow the two plate members to assume an orientation defining a non-rectangular a parallelogram or lozenge. In other words, their direction can be reorientated while they remain mutually parallel. This is achieved by providing domed washers 8 at each connection set into the respective plate members 1, 2.

Depending from the bracket 4 between the plate members 1, 2 is a reaction plate 4A (forming part of the bracket 4) and a substantially rectangular steering column tube member 9 is located between the inside of the first plate member 1 and one side of the reaction plate 4A. The steering column tube member 9 is adjustable to allow the steering wheel to be adjusted to a desired position by the vehicle driver.

An actuating member 10, in the present embodiment being in the form of a screw actuator, is provided to act between the opposite side of the reaction plate 4A to the tube member 9 and the second plate member 2.

FIG. 1 illustrates the situation in the substantially unclamped state of the steering column tube member 9 and it will be seen that, by screwing the actuator 10 into the plate 2 by rotating its squared end 10A, a head 10B of the actuator 10 will be urged to the left to bear on the reaction plate 4A. By virtue of the provision of the washers 8 and since the reaction plate 4A is fixed, this will have the effect of urging the plate 2 to the right as viewed in FIG. 1 away from the reaction plate 4A and the leverage so provided will, through the connecting links 3 and 5 and the plate member 1, cause these members and links to assume a non-rectangular parallelogram, or lozenge, form taking up any manufacturing tolerances, and causing the plate member 1 to be drawn in compression against the steering column tube member 9 to clamp it in position.

Figure 2:
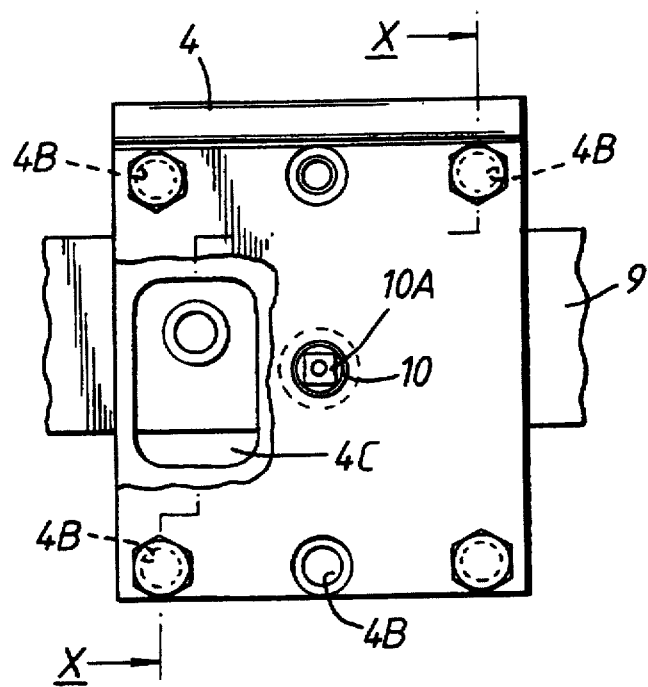

It will be appreciated that the bore 4B through the bracket 4 through which the connecting link 3 passes should be oval or in some other way elongate to allow for free movement or tilting of the connecting link; this is especially true in the case envisaged where more than two connecting links are provided. As an example, in the present case, FIG. 2 demonstrates that the bracket 4 is provided with six holes or bores 4B to allow for the use of two, four or six connecting links.

It will be appreciated that because of the point contact of the head 10B of the clamped screw 10, the assembly is allowed to assume the form of a lozenge as described and the steering column tube member 9 is compressed between the bracket reaction plate 4A and the plate member 1. Any out of parallel condition of the steering column tube is compensated for by the fact that the plate members 1, 2 can tilt out of parallel to the reaction plate 4A. This effect also helps to widen the tolerance of the bolt length and nut position, as the plates 1, 2 themselves do not need to be exactly parallel to the reaction plate 4A.

The reaction plate 4A is provided with a substantially rectangular opening 4C and this accommodates a protrusion on the outside of the steering column tube 9, the protrusion being in the form of a pin 11 with a soft covering 11a which rides in the rectangular opening in order to limit steering column travel, the soft covering giving a soft feel when reaching the end positions in the opening 4C.

Having described the invention, what is claimed is:

1. A steering column clamping mechanism comprising:
   two substantially parallel, spaced apart plate members;
   a first connecting link joining said two plate members;
   a bracket supporting said first connecting link;
   a second connecting link joining said two plate members remote from said first connecting link; a reaction plate between said two plate members;
   a steering column tube member located between said first and second connecting links and located between and being clampable by one of said plate members and one side of said reaction plate; and
   an actuating member located to act between the other of said two plate members and the opposite side of said reaction plate, the respective connections between said two plate members and said first and second connecting links being such as to allow said two plate members to reorientate their direction while maintaining their parallelism to one another when said actuating member is caused to urge said other plate member and said reaction plate apart, thereby to cause said one plate member and said reaction plate to clamp said steering column tube member.

2. The steering column clamping mechanism according to claim 1, wherein said reaction plate is joined to and forms part of said bracket.

3. The steering column clamping mechanism according to claim 1, wherein said first connecting link is in the form of a bolt member passing through said bracket and having opposite ends anchored to said first and second plate members.

4. The steering column clamping mechanism according to claim 1, wherein said second connecting link is a bolt member anchored at opposite ends to said first and second plate members, respectively.

5. The steering column clamping mechanism according to claim 1, wherein the respective connections between said two plate members and said first and second connecting links are in the form of washers.

6. The steering column clamping mechanism according to claim 5, wherein the washers are domed washers set in their plate members.

7. The steering column clamping mechanism according to claim 1, wherein, when viewed on end, said plate members and their connecting links are substantially in the form of a rectangle and said reaction plate is substantially parallel, in an unclamped state of the tube member, to the two plate members.

8. The steering column clamping mechanism according to claim 1, wherein the steering column tube member in the region where it passes through the clamping mechanism is substantially rectangular in outer section.

9. The steering column clamping mechanism according to claim 1, wherein said actuating member is in the form of a clamp bolt which is threadably engaged in said second plate member to extend the clamp bolt towards and away from said reaction plate.

10. The steering column clamping mechanism according to claim 1, wherein said actuating member is a cam arrangement.

11. The steering column clamping mechanism according to claim 1, wherein said actuating member is a solenoid-operated actuating member.

12. The steering column clamping mechanism according to claim 1, wherein a protrusion is provided on the outside of said steering column tube member, which protrusion rides in a slot provided in said reaction plate to limit travel of the steering column tube member.

13. A steering column clamping mechanism for clamping a steering column member, the mechanism comprising:
   two spaced apart floating plate members, each plate member having a first end and a second end;
   at least one first connecting link interconnecting first ends of the two plate members;
   at least one second connecting link interconnecting second ends of the two plate members, the second connecting link being spaced apart from the first connecting link;
   a bracket supporting said at least one first connecting link;
   a fixed reaction plate projecting from said bracket between the two plate members, the steering column tube being located between the first and second connecting links and being located between one of the floating plate members and the fixed reaction plate; and means for actuating to urge the other of the floating plate members and the fixed reaction plate apart and to clamp the steering column tube between said one floating plate member and the fixed reaction plate.

14. The steering column clamping mechanism according to claim 13, wherein the first and second connecting links include domed washers set in the plate members.

15. The steering clamping mechanism according to claim 13, wherein the steering column member in the region where it passes through the clamping mechanism is substantially rectangular in outer section.

16. The steering column clamping mechanism according to claim 1, further comprising:

a protrusion on the outside of the steering column member; and a corresponding aperture within the reaction plate to limit movement of the steering column member relative to the reaction plate.

17. A steering column clamping mechanism for clamping a steering column member, the mechanism comprising:

two substantially parallel spaced apart plate members;

at least one first connecting link interconnecting the plate members;

at least one second connecting link interconnecting the plate members, the second connecting link being substantially parallel to and spaced apart from the first connecting link, the two plate members and the first and second connecting links forming a parallelogram;

a fixed bracket supporting at least one of the first connecting links;

a reaction plate fixedly supported by said fixed bracket between the two plate members, the steering column tube being located within the parallelogram defined by the first and second connecting links, the reaction plate and one of the plate members; and means for actuating to urge the other of the plate members and the reaction plate apart and to clamp the steering column tube between said one plate member and the reaction plate.

18. The steering column clamping mechanism according to claim 17, wherein the first and second connecting links include domed washers set in the plate members.

19. The steering column clamping mechanism according to claim 17, further comprising:

a protrusion on the outside of the steering column member; and a corresponding aperture within the reaction plate to limit movement of the steering column member relative to the reaction plate.

20. A steering column clamping mechanism for clamping a steering column member, the mechanism comprising:

two substantially parallel spaced apart floating plate members;

at least one first connecting link interconnecting the plate members;

at least one second connecting link interconnecting the plate members, the second connecting link being substantially parallel to and spaced apart from the first connecting link, the two plate members and the first and second connecting links forming a parallelogram;

a bracket supporting said at least one first connecting link;

a reaction plate fixed to said bracket between the two plate members, the steering column tube being located within the parallelogram defined by the first and second connecting links, the reaction plate and one of the plate members, the steering column member in the region within the parallelogram having an outer section which is substantially rectangular; and a means for actuating to urge the other of the plate members and the reaction plate apart and to clamp the steering column tube between said one plate member and the reaction plate.

21. The steering column clamping mechanism according to claim 20, further comprising:

means for permitting tilting movement of the first and second connecting links relative to the floating plate members.

22. The steering column clamping mechanism according to claim 21, wherein the means for permitting tilting movement includes domed washers set in the plate members.

* * * * *